(12) United States Patent
Fukushima et al.

(10) Patent No.: US 6,494,406 B1
(45) Date of Patent: Dec. 17, 2002

(54) ROCKET FAIRING AND METHOD OF OPENING THE SAME

(75) Inventors: Yukio Fukushima, Minato-Ku (JP); Ryuzo Shimizu, Minato-Ku (JP); Hiroshi Matsunaga, Minato-Ku (JP); Yoshifumi Yasunaga, Kakamigahara (JP); Yutaka Matsuda, Kakamigahara (JP)

(73) Assignees: National Space Development Agency of Japan, Tokyo (JP); Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/466,868

(22) Filed: Dec. 20, 1999

(30) Foreign Application Priority Data

Dec. 24, 1998 (JP) ............................................. 10-367858

(51) Int. Cl.[7] ................................................. B64G 1/10
(52) U.S. Cl. .................................................. 244/158 R
(58) Field of Search ........................ 244/158 A, 158 R, 244/118.2, 161; 102/374, 377

(56) References Cited

U.S. PATENT DOCUMENTS 5,178,347 A * 1/1993 Johnson et al. ......... 244/158 R
5,529,264 A * 6/1996 Bedegrew et al. .......... 102/274
5,613,653 A * 3/1997 Bombled et al. ....... 244/158 R

FOREIGN PATENT DOCUMENTS

JP      06308745     12/1994

OTHER PUBLICATIONS

Molette, P., "Sylda. Systeme de lancement double Ariane. Configuration et definition de la structure.", L'Aeronautique et L'Astronautique, 1979, No. 74, pp. 12–20.
Isakowitz, Steven J., "International Reference guide to Space Launch Systems.", 1991.

* cited by examiner

Primary Examiner—Peter M. Poon
Assistant Examiner—T D. Collins
(74) Attorney, Agent, or Firm—Oliff & Berridge, PLC

(57) ABSTRACT

A rocket fairing mounted on a forward section of a rocket body included in a rocket comprises a first structure formed on the fairing-base side, and including a first side wall defining a first storage space for storing a first payload; and a second structure formed on the fairing-forward side, and including a second side wall defining a second storage space for storing a second payload. The first side wall has a plurality of first side wall segments capable of being separated from each other along a plane including the longitudinal axis of the fairing and of being turned away from the first payload when releasing the first payload from the first storage space. The second side wall has a plurality of second side wall segments capable of being separated from each other along a plane including the longitudinal axis of the fairing and of being turned away from the second payload when releasing the second payload from the second storage space.

9 Claims, 12 Drawing Sheets

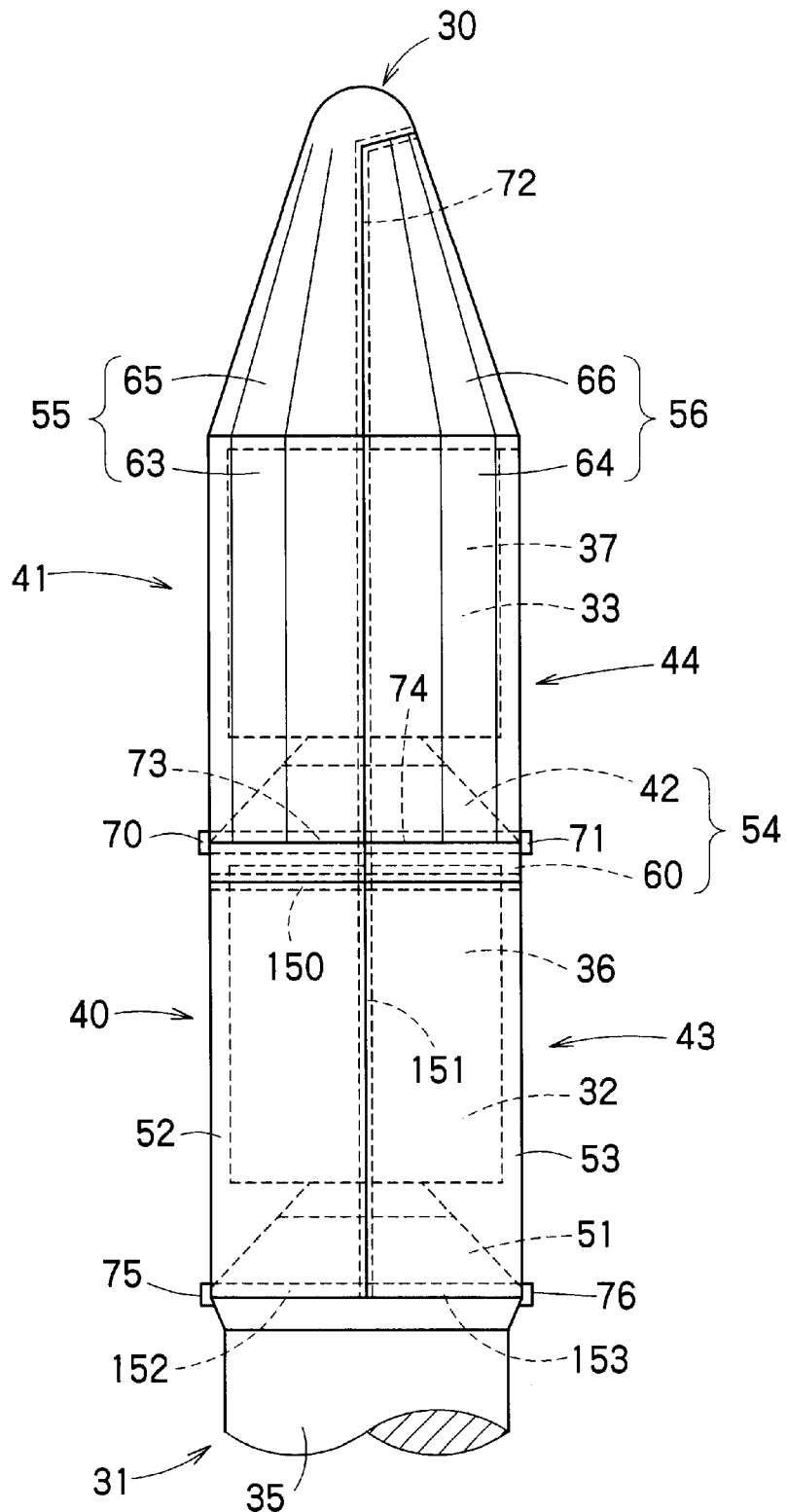
F I G. 1

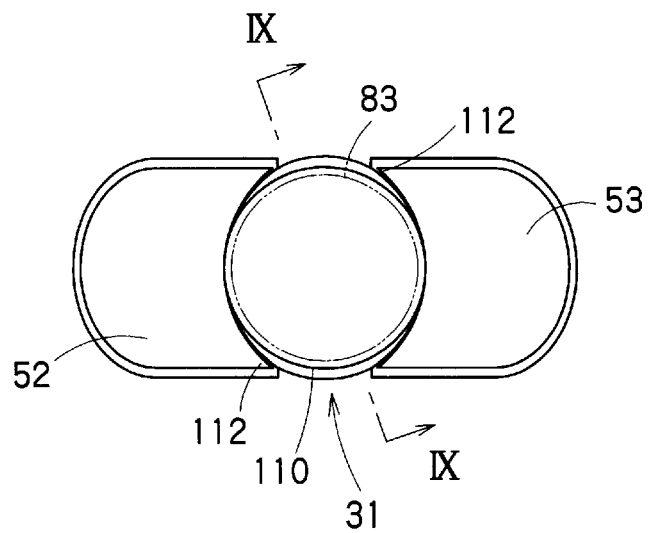
F I G. 8
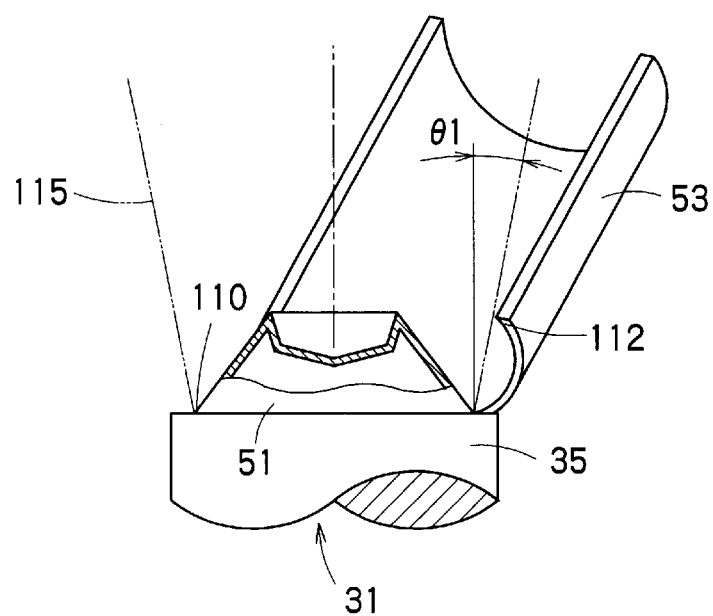
F I G. 9

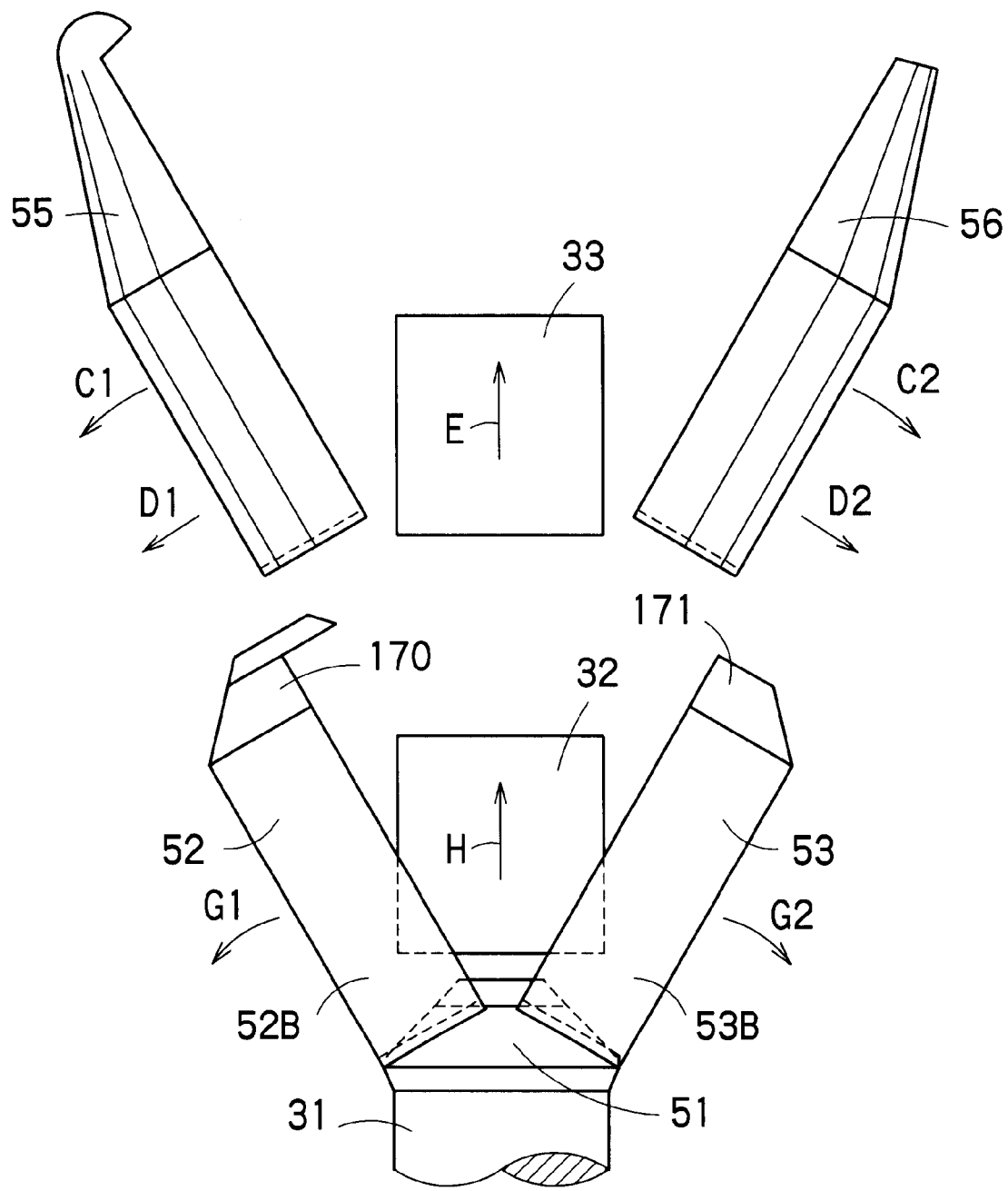
F I G. 12

ROCKET FAIRING AND METHOD OF OPENING THE SAME

BACKGROUND OF THE INVENTION

1. Field of the Invention

The present invention relates to a rocket fairing for use with a rocket for simultaneously launching a plurality of satellites, and a method of opening the rocket fairing.

2. Description of the Related Art

Two artificial satellites (hereinafter referred to simply as "satellites") are mounted on the rocket body (sometimes, referred to simply as "body") of a rocket and the two satellites are launched simultaneously to launch the satellites efficiently.

Referring to FIG. 14 showing a conventional rocket fairing 6 for dual satellite launching in a front elevation, the rocket fairing 6 is attached to a forward section 11 of a rocket body 1 included in a rocket. The rocket fairing 6 defines two storage spaces, i.e., a first storage space 4 and a second storage space 5. The rocket fairing 6 has a first support structure 7 and a second support structure 8 respectively for supporting a first satellite 2 and a second satellite 3, and a first shell 9 and a second shell 10 respectively surrounding the satellites 2 and 3. The satellites 2 and 3 are stored in the storage spaces 4 and 5 formed in the fairing 6 and are supported by the support structures 7 and 8 disposed on the side of the rocket body 1 relative to the satellites 2 and 3, respectively.

FIG. 15 is an exploded front elevation of the fairing 6 shown in FIG. 14. The fairing 6 can be divided into a plurality of components 12 to 15. The first component 12 has the frustum-shaped first support structure 7 and a cylindrical side wall 16. The first support structure 7 is fitted in the side wall 16. The outer surface of an end portion of the first support structure 7 on the fairing-base side is continuous with the outer surface of an end portion of the side wall 16 on the fairing-base side. The first support structure 7, i.e., a component of the component 12, is also a component of the forward section 11 of the body 1. The first component 12 is attached to the forward section 11 of the body 1.

The second component 13 has the frustum-shaped second support structure 8 and a cylindrical side wall 17. The second support structure 8 is continuous with the forward end of the side wall 17 on the fairing-forward side and is tapered away from the side wall 17. The other end, i.e., the base end, of the side wall 17 of the second component 13 on the fairing-base side is connected detachably to the forward end of the side wall 16 of the first component 12 on the fairing-forward side. The components 12 and 13 define the first storage space 4. The side walls 16 and 17 form the first shell 9 surrounding the first satellite 2 stored in the first storage space 4.

The third component 14 and the fourth component 15 form the second shell 10 for covering the second satellite 3. The components 14 and 15 have semicylindrical side wall segments 18 and 19, and semiconic segments 20 and 21, respectively. The components 14 and 15 can detachably be joined together. The second shell 10 having a closed nose and the shape of a tapered shell is formed when the components 14 and 15 are joined together. The second shell 10 is put on the second component 13 with the base ends of the semicylindrical side wall segments 18 and 19 on the fairing-base side detachably connected to the forward end of the side wall 17 of the second component 13 on the fairing-forward side. When the second shell 10 is connected to the second component 13, the second support structure 8 of the second component 13 is received in a space defined by the cylindrical side wall formed by joining together the semicylindrical side wall segments 18 and 19. The components 14 and 15 and the support structure 8 define the second storage space 5. The semicylindrical side wall segments 18 and 19 of the components 14 and 15 form the second shell 10 surrounding the satellite 3.

The storage spaces 4 and 5 respectively containing the satellites 2 and 3 are opened, the satellites 2 and 3 are disconnected from the support structures 7 and 8, and the satellites 2 and 3 are released into space. More specifically, the components 14 and 15 are unfastened from each other and from the second component 13, the second shell 10 is split by a parting plane including the longitudinal axis of the fairing 6, i.e., a longitudinal parting plane, and the components 14 and 15 are moved away from the satellite 3 to open the storage space 5, and then the satellite 3 is disconnected from the support structure 8 and is released into space. Subsequently, the second component 13 is disconnected and separated from the first component 12 to split the side wall 9 along a plane perpendicular to the longitudinal axis of the fairing 6, the second component 13 is moved away from the satellite 2 to open the storage space 4, and then the satellite is disconnected from the support structure 7 and is released into space.

Referring to FIG. 16 showing the conventional fairing 6 in a sectional view, the first storage space 4 formed on the fairing-base side to store the first satellite 2 is opened by splitting the side wall 9 by a parting plane perpendicular to the longitudinal axis of the fairing 6. When the first storage space 4 is thus opened, the side wall 16 forming a portion of the side wall 9 and surrounding a portion of the first satellite 2 on the fairing-base side is held on the forward section 11 of the rocket body 1. When releasing the first satellite 2, it is difficult to disconnect and release the first satellite 2 from the first support structure 7 such that the first satellite 2 moves away from the first support structure 7 along the longitudinal axis of the fairing 6 without tilting its axis. Sometimes, an error in a direction in which the first satellite 2 is released, i.e., the difference between a direction in which the first satellite 2 is released and the longitudinal axis of the fairing 6, and the tilting of the first satellite occur.

If the portion of the first satellite 2 on the fairing-base side is formed in a cylindrical shape conforming to the shape of the side wall 16, it is possible that the side wall 16 interferes with the portion of the first satellite 2 on the fairing-base side due to the deviation of the direction of movement of the first satellite 2 from the correct direction and the tilting of the first satellite when the first satellite 2 is released.

To avoid such interference between the side wall 16 and the portion of the first satellite 2, an available region 27 available for receiving the first satellite 2 becomes small; that is, the size of the first satellite 2 must be reduced. Therefore, while a portion of an available region 28 available for receiving the second satellite 3 on the fairing-base side may be cylindrical, a portion of the available region 27 available for receiving the first satellite 2 on the fairing-base side must be tapered. Consequently, a cylindrical region of the same diameter as that of the available region 28 for receiving the second satellite 3 cannot be formed in the available region 27 for receiving the first satellite 2.

SUMMARY OF THE INVENTION

Accordingly, it is an object of the present invention to provide a rocket fairing for use with a rocket body included in a rocket mounted with a plurality of payloads, capable of forming a large space for receiving the payload disposed on the fairing-base side, and a method of opening the rocket fairing.

According to one aspect of the present invention, a rocket fairing mounted on a forward section of a rocket body included in a rocket comprises: a first structure for storing a first payload disposed on the fairing-base side, and a second structure for storing a second payload disposed on the on the fairing-forward side, connected to a forward end of the first structure on the fairing-forward side and forming a forward section of the fairing; wherein the first structure comprises a first side wall defining a first storage space for storing the first payload therein, and a first support structure disposed in the first storage space to support the first payload by its base part; the first side wall comprising a plurality of first side wall segments capable of being separated from each other along a plane including the longitudinal axis of the fairing and of being turned away from the first payload when releasing the first payload from the first storage space.

Preferably, the base end of each of the first side wall segment on the fairing-base side is pivotally joined to the forward end of the rocket by a hinge mechanism having first and second joint members capable of separating from each other when the first side wall segment is turned through an angle exceeding a predetermined angle.

Preferably, the first joint member of the hinge mechanism is a movable joint member attached to the base end of the first side wall segment and provided with a retaining pin, and the second joint member is a fixed joint member attached to the rocket body of the rocket and provided with hinge pins, the movable joint member is provided with slots for receiving the hinge pins of the fixed joint member, formed in its base end portion so as to extend from its base end toward the forward end of the fairing, and the fixed joint member is provided with a slot for receiving the retaining pin of the movable joint member, formed in its forward portion on the fairing-forward side so as to extend inwardly from its outer side.

Preferably, a plurality of first structures similar to the foregoing first structure are connected end to end, and the second structure is connected to the first structure nearest to the forward end of the fairing.

Preferably, the rocket fairing further comprises a holding means for holding the opened first side wall segments of the first side wall at an angle smaller than the predetermined angle in order that the opened first side wall segments remain on the forward end part of the rocket body.

Preferably, the rocket fairing further comprises an opening means capable of applying forces to the plurality of first side wall segments to move the same away from the first payload when opening the first side wall.

Preferably, the rocket fairing further comprises a second support structure adapted to support the second payload, the second support structure comprises a plurality of second support segments formed integrally with the plurality of first side wall segments, respectively, and the second support segments are opened together with the first side wall segments when the first side wall is opened.

According to a second aspect of the present invention, a rocket fairing opening method of opening a rocket fairing mounted on a forward section of a rocket body included in a rocket, comprising a first structure for storing a first payload disposed on the fairing-base side, including a first side wall defining a first storage space for storing the first payload therein and having a plurality of first side wall segments capable of being separated from each other along a plane including the longitudinal axis of the fairing, and a first support structure disposed in the first storage space to support the first payload by its base part; and a second structure for storing a second payload disposed on the fairing-forward side, connected to a forward end of the first structure on the fairing-forward side, forming a forward section of the fairing, and including a second side wall defining a second storage space for storing the second payload therein and having a plurality of second side wall segments capable of being separated from each other along a plane including the longitudinal axis of the fairing and of being turned away from the second payload; comprises the steps of: opening the plurality of second side wall segments of the second side wall of the second structure defining the second storage space so that the second side wall segments are moved away from the second payload; separating the second payload from the second support structure and releasing the same; and opening the first structure defining the first storage space storing the first payload by dividing the first side wall along the planes including the longitudinal axis of the fairing into the plurality of first side wall segments and moving the first side wall segments and the second support structure away from the first payload before separating the first payload from the first support structure and releasing the same.

Preferably, the first side wall segments are separated from the forward end of the rocket body of the rocket when the first side wall is opened.

Preferably, the base end of each of the first side wall segments on the fairing-base side is pivotally connected to the forward end of the forward section of the rocket by a hinge mechanism having first and second joint members capable of separating from each other when the first side wall segment is turned through an angle exceeding a predetermined angle.

Preferably, the first joint member of the hinge mechanism is a movable joint member attached to the base end of the first side wall segment and provided with a retaining pin, and the second joint member is a fixed joint member attached to the rocket body of the rocket and provided with hinge pins, the movable joint member is provided with slots for receiving the hinge pins of the fixed joint member, formed in its base end portion so as to extend from the base end toward the forward end of the fairing, the fixed joint member is provided with a slot for receiving the retaining pin of the movable joint member, formed in its forward portion on the fairing-forward side so as to extend inwardly from its outer side, the movable hinge segment turns together with the first side wall segment on the hinge pin of the fixed joint member, the retaining pin of the movable joint member moves out of the slot of the fixed joint member and the movable joint member separates from the hinge pins of the fixed joint member when the first side wall segment is turned through an angle exceeding the predetermined angle, and each of the first side wall segments separates from the forward end of the rocket body of the rocket.

Preferably, a plurality of first structures similar to the foregoing first structure are connected end to end, a plurality of first payloads are stored in first storage spaces defined by the first structures, the second structure is connected to the forward end of the first structure nearest to the forward end of the fairing, and the plurality of first structures are opened successively starting from the first structure nearest to the forward end of the fairing toward the first structure nearest to the base end of the fairing to release the plurality of first payloads successively after opening the second structure and releasing the second payload.

Preferably, the separated first side wall segments of the opened first side wall remain on the forward end part of the rocket body of the rocket.

Preferably, the base end of each of the first side wall segments on the fairing-base side is connected pivotally to the forward end of the forward section of the rocket by a hinge mechanism having first and second joint members capable of separating from each other when the first side wall segment is turned through an angle exceeding a predetermined angle when the first side wall is opened, and the first side wall segments are held at an angle smaller than the predetermined angle by a holding means to hold the first side wall segments on the forward section of the rocket body of the rocket when the first side wall is opened.

Preferably, the first joint member of the hinge mechanism is a movable joint member attached to the base end of the first side wall segment and provided with a retaining pin, the second joint member is a fixed joint member attached to the rocket body of the rocket and provided with hinge pins, the movable joint member is provided with slots for receiving the hinge pins of the fixed joint member, formed in its base end portion so as to extend from its base end toward the forward end of the fairing, the fixed joint member is provided with a slot for receiving the retaining pin of the movable joint member, formed in its forward portion on the fairing-forward side so as to extend inwardly from its outer side, the movable joint member turns on the hinge pin of the fixed joint member together with the first side wall segment when the first side wall is opened, the first side wall segment is restrained from turning by the holding means before the first side wall segments are turned through an angle exceeding the predetermined angle, and the first side wall segments are held in an opened position at an angle smaller than the predetermined angle.

Preferably, force for moving the plurality of first side wall segments away from the first payload is applied to the first side wall segments by an opening means.

Preferably, the second support structure comprises a plurality of second support segments formed integrally with the plurality of first side wall segments, respectively, and the second support segments are opened together with the first side wall segments when the first side wall is opened.

In this specification, the term "open" or "open a fairing" signifies to split the fairing into a plurality of portions to release a payload stored in a storage space defined by the fairing, and to displace the plurality of potions so as to open the storage space. The term "fairing-base side" signifies the side of the base end of the fairing. The term 11 fairing-forward side, signifies the side of the forward end of the fairing.

BRIEF DESCRIPTION OF THE DRAWINGS

The above and other objects, features and advantages of the present invention will become more apparent from the following description taken in connection with the accompanying drawings, in which:

FIG. 1 is a front elevation of a fairing in a first embodiment according to the present invention;

FIG. 8 is a top plan view of a portion of the fairing shown in FIG. 4;

FIG. 9 is a sectional view taken on line IX—IX in FIG. 8;

FIG. 12 is an exploded front elevation of the fairing shown in FIG. 11;

DESCRIPTION OF THE PREFERRED EMBODIMENTS

Figure 2:
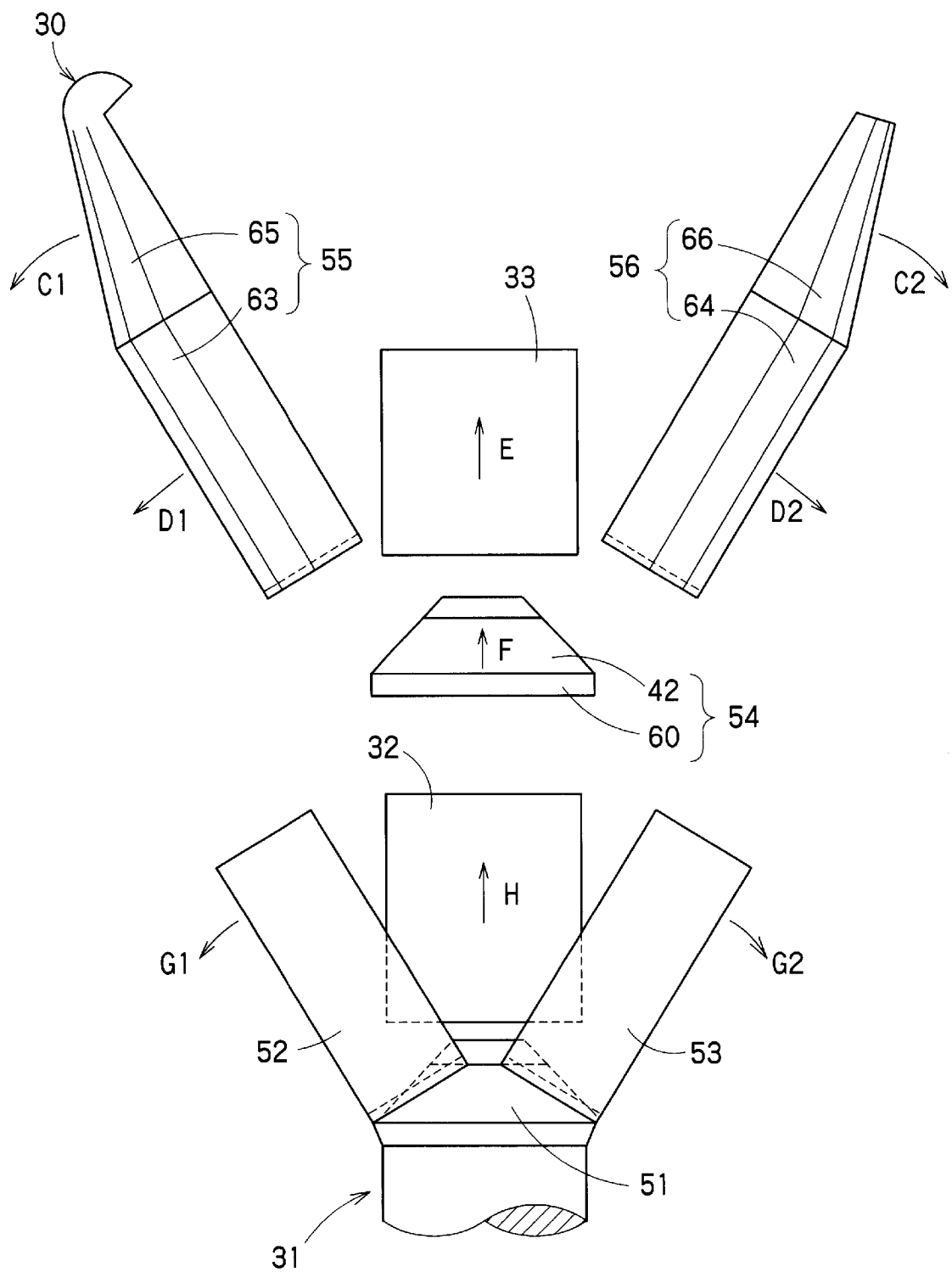
FIG. 2 is an exploded front elevation of the fairing shown in FIG. 1.

A rocket fairing 30 in a preferred embodiment according to the present invention shown in FIG. 1 is intended for use with a rocket for dual satellite launching. Two artificial satellites (hereinafter referred to simply as "satellites"), i.e., a first satellite 32 and a second satellite 33, are mounted on a rocket body (sometimes referred to simply as "body") 31 included in the rocket and are launched simultaneously for efficient satellite launching.

The fairing 30 is connected to a forward section 35 of the body 31 propelled by rocket engines. The fairing 30 has a first structure 40 for storing the first satellite (first payload) 32 disposed on the fairing-base side, and a second structure 41 storing the second satellite (second payload) 33 disposed on the fairing-forward side.

The first structure 40 has a cylindrical first side wall 43 having the shape of a right circular cylinder and defining a first storage space 36 for storing the first satellite 32, and a frustum-shaped first support structure 51 disposed in the first storage space 36 to support the first satellite 32 by its base part on the fairing-base side. The first side wall 43 comprises two first side wall segments 52 and 53. When releasing the first satellite 32 from the first storage space 36, the first side wall 43 is opened so that the first side wall segments 52 and 53 are parted along a plane including the longitudinal axis of the fairing 30 from each other and are moved away from the first satellite 32.

The second structure 41 has a second side wall 44 defining a second storage space 37 for storing the second satellite 33, and a frustum-shaped second support structure 42 disposed in the second storage space 37 to support the second satellite 33 by its base part on the fairing-base side. The second side wall 44 comprises two second side wall segments 55 and 56. When releasing the second satellite 33 from the second storage space 37, the second side wall 44 is opened so that the second side wall segments 55 and 56 are parted along a plane including the longitudinal axis of the fairing 30 from each other and are moved away from the second satellite 33.

Referring to FIGS. 1 and 2, the fairing 30 can be divided into the foregoing components 51, 52, 53, 55 and 56. The first support structure 51 is formed integrally with the forward section 35 of the body 31. The first side wall segments 52 and 53 are semicylindrical and are detachably joined together to form the cylindrical first side wall 43; that is, the cylindrical first side wall 43 can be split along a plane including the longitudinal axis of the fairing 30 into the semicylindrical first side wall segments 52 and 53.

The cylindrical first side wall 43 formed by joining together the first side wall segments 52 and 53 is mounted on the forward section 35 of the body 31. The ends of the first side wall segments 52 and 53 on the fairing-base side detachably joined to an end of the first support structure 51 formed integrally with the forward section 35 of the body 31 on the fairing-base side, i.e., a large end portion of the first support structure 51. In a state where the first side wall segments 52 and 53 are joined to the first support structure 51, the first support structure 51 is received in the space defined by the cylindrical first side wall 43 formed by joining together the first side wall segments 52 and 53.

A middle dividing structure 54 comprises the frustum-shaped second support structure 42 and a cylindrical side wall 60 having the shape of a right circular cylinder. The second support structure 42 is connected to an end of the cylindrical side wall 60 on the fairing-forward side and is tapered toward the forward end of the fairing 30. An end of the side wall 60 of the middle dividing structure 54 on the fairing-base side is joined detachably to the forward ends of the first side wall segments 52 and 53.

The second side wall segments 55 and 56 have semicylindrical parts 63 and 64 and semiconic parts 65 and 66, respectively. The second side wall segments 55 and 56 are detachably joined together to form the second side wall 44 having a closed nose and the shape of a tapered shell. The semicylindrical parts 63 and 64 of the second side wall 44 formed by joining together the second side wall segments 55 and 56 are joined detachably to the forward end of the side wall 60 of the middle dividing structure 54. In this state, the second support structure 42 is received in a space defined by a cylinder formed of the semicylindrical parts 63 and 64.

The first support structure 51, the first side wall segments 52 and 53, and the middle dividing structure 54 define the first storage space 36. The first satellite 32 supported on the first support structure 51 in the first storage space 36 is surrounded by the first side wall 43 formed by joining together the first side wall segments 52 and 53. The middle dividing structure 54 and the second side wall segments 55 and 56 define the second storage space 37. The second satellite 33 supported on the second support structure 42 in the second storage space 37 is surrounded by the second side wall 44 formed by joining together the second side wall segments 55 and 56. In this embodiment, the outer surface of the side wall 60 of the middle dividing structure 54 is flush with the outer surfaces of the first side wall 43 and the second side wall 44. The side wall 60 of the middle dividing structure 54 serves as part of a side wall surrounding the first satellite 32.

When launching the satellites 32 and 33 by the rocket provided with the fairing 30, the satellites 32 and 33 are placed in the storage spaces 36 and 37 defined by the fairing 30, respectively, and the rocket body 31 is propelled by a rocket propulsion system to an orbit for the satellite 32 and 33. After the rocket has arrived at the orbit, the first side wall 43 and the second side wall 44 respectively surrounding the first satellite 32 and the second satellite 33 are opened so that the first side wall segments 52 and 53, and the second side wall segments 55 and 56 are separated from each other to open the first storage space 36 and the second storage space 37. The first satellite 32 and the second satellite 33 are disconnected from the first support structure 51 and the second support structure 42 and are released onto the orbit.

More specifically, the second satellite 33 on the fairing-forward side is released first. First, upon the arrival of the rocket at a predetermined altitude where the satellites 32 and 33 need not be protected from environmental effect, such as aerodynamic heating, the second side wall segments 55 and 56 are separated from each other and from the middle dividing structure 54, and are moved away from the second satellite 33.

Hinge mechanisms 70 and 71 hold the semicylindrical parts 63 and 64 by their middle portions of the semicircular base ends on the middle dividing structure 54, respectively. The hinge mechanisms 70 and 71 hold the second side wall segments 55 and 56 on the middle dividing structure 54 when the second side wall segments 55 and 56 are joined together as shown in FIG. 1. The second side wall segments 55 and 56 are tilted at an angle below a first predetermined angle to the axis of the middle dividing structure 54, so that the second side wall segments 55 and 56 are able to move in an angular range of naught to the first predetermined angle. When the second side wall segments 55 and 56 are turned through an angle not smaller than the first predetermined angle to the axis of the middle dividing structure 54, the hinge mechanisms 70 and 71 disconnect the second side wall segments 55 and 56, respectively, from the middle dividing structure 54.

The middle dividing structure 54 and the second side wall segments 55 and 56 are fastened together by unfastenable fastening mechanisms 72, 73 and 74. When the fastening mechanisms 72, 73 and 74 are unfastened, the second side wall segments 55 and 56 are unfastened from each other and from the middle dividing structure 54. Subsequently, the second side wall segments 55 and 56 are turned on the hinge mechanisms 70 and 71 in the directions of the arrows C1 and C2, respectively, by opening mechanisms, not shown. The opening mechanisms comprises springs so that the forward ends of the second side wall segments 55 and 56 are moved away from each other.

After the second side wall segments 55 and 56 have been turned through an angle not smaller than a second predetermined angle smaller than the first predetermined angle by the opening mechanism, the second side wall segments 55 and 56 continue to turn further by the agency of inertia and a reaction force opposite to the propulsion of the rocket. Upon the increase of the angle of turning of the second side wall segments 55 and 56 to the first predetermined angle, the second side wall segments 55 and 56 are released from the hinge mechanisms 70 and 71, separate from the middle dividing structure 54 in the directions of the arrows D1 and D2, respectively. After the second side wall 44 surrounding the second satellite 33 has thus been opened and the second side wall segments 55 and 56 have been moved away from the second satellite 33, the second satellite 33 is disconnected from the middle dividing structure 54 and is released by being pushed by a spring mechanism, not shown, in a direction away from the middle dividing structure 54, i.e., in the direction of the arrow E away from the body 31.

The first satellite 32 disposed on the fairing-base side is released by the following procedure. After the second satellite 33 disposed on the fairing-forward side has been released, the body 1 is moved to an orbit for the first satellite 32. Upon the arrival of the body 31 at the orbit for the first satellite 32, the middle dividing structure 54 is separated from the first side walls 52 and 53, and the first side walls 52 and 53 are separated from each other to open the first structure 40.

Middle portions of the semicircular base ends of the semicylindrical first side wall segments 52 and 53 are connected to the first support structure 51 by hinge mechanisms 75 and 76, respectively. The hinge mechanisms 75 and 76 are similar in construction to the hinge mechanism 70 and 71. The hinge mechanisms 75 and 76 hold the first side wall segments 52 and 53 on the first support structure 51 when the first side wall segments 52 and 53 are joined together as shown in FIG. 1. The first side wall segments 52 and 53 are tilted at an angle below a first predetermined angle to the axis of the first support structure 51, so that the first side wall segments 52 and 53 are able to move in an angular range of naught to the first predetermined angle. When the first side wall segments 52 and 53 are turned through an angle not smaller than the first predetermined angle to the axis of the first support structure 51, the hinge mechanisms 75 and 76 disconnect the first side wall segments 52 and 53, respectively, from the first support structure 51.

Figure 4:
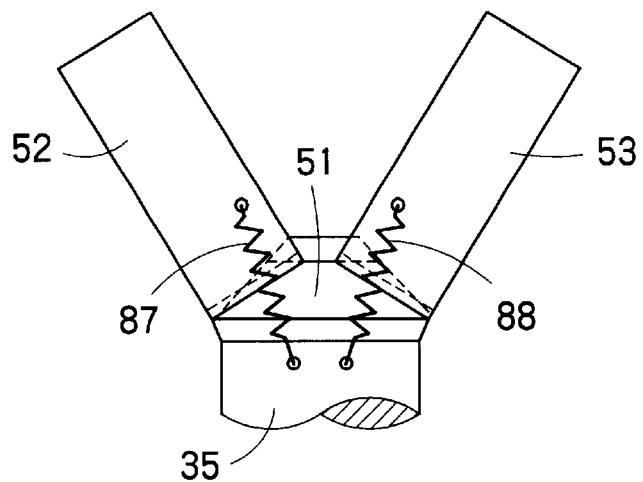
FIG. 4 is a front elevation of first side wall segments and an opening mechanism included in the fairing shown in FIG. 1.

The first support structure 51, the first side wall segments 52 and 53, and the middle dividing structure 54 are fastened together by unfastenable fastening mechanisms 150, 151, 152 and 153 in a state shown in FIG. 1. When the fastening mechanisms 150, 151, 152 and 153 are unfastened, the first side wall segments 52 and 53 are unfastened from each other and from the first support structure 51 and the middle dividing structure 54. Subsequently, the middle dividing structure 54 is separated from the first side wall segments 52 and 53 and is ejected away from the first satellite 32 in the direction of the arrow F by an opening mechanism, not shown, comprising springs. Then, the first side wall segments 52 and 53 are turned on hinge mechanisms 75 and 76 in the directions of the arrows G1 and G2, respectively, by an opening mechanisms 87 and 88 comprising springs as shown in FIG. 4 so that the forward ends of the first side wall segments 52 and 53 are moved away from each other.

After the first side wall segments 52 and 53 have been turned through an angle not smaller than a second predetermined angle smaller than the first predetermined angle by the opening mechanisms 87 and 88, the first side wall segments 52 and 53 continue to turn further by the agency of inertia and a reaction force opposite to the propulsion of the rocket. Upon the increase of the angle of turning of the first side wall segments 52 and 53 to a third predetermined angle smaller than the first predetermined angle and greater than the second predetermined angle, the first side wall segments 52 and 53 are held at the third predetermined angle by the opening mechanisms 87 and 88.

The first side wall segments 52 and 53 of the first side all 43 surrounding the first satellite 32 disposed on the fairing-base side are split and turned so as to separate from the first satellite 32. Subsequently, the first satellite 32 is pushed and released from the first support structure 51 by a spring mechanism, not shown, in the direction of the arrow H.

In the rocket fairing 30 embodying the present invention, the first side wall 43 surrounding the first satellite 32 disposed on the fairing-base side are divided along a plane including the longitudinal axis of the fairing 30 into the first side wall segments 52 and 53, and the first side wall segments 52 and 53 are turned away from the first satellite 32. Therefore, when disconnecting and releasing the first satellite 32 from the first support structure 51, the first side wall 43 does not exist near the first satellite 32 and is moved away from the first satellite 32.

Figure 3:
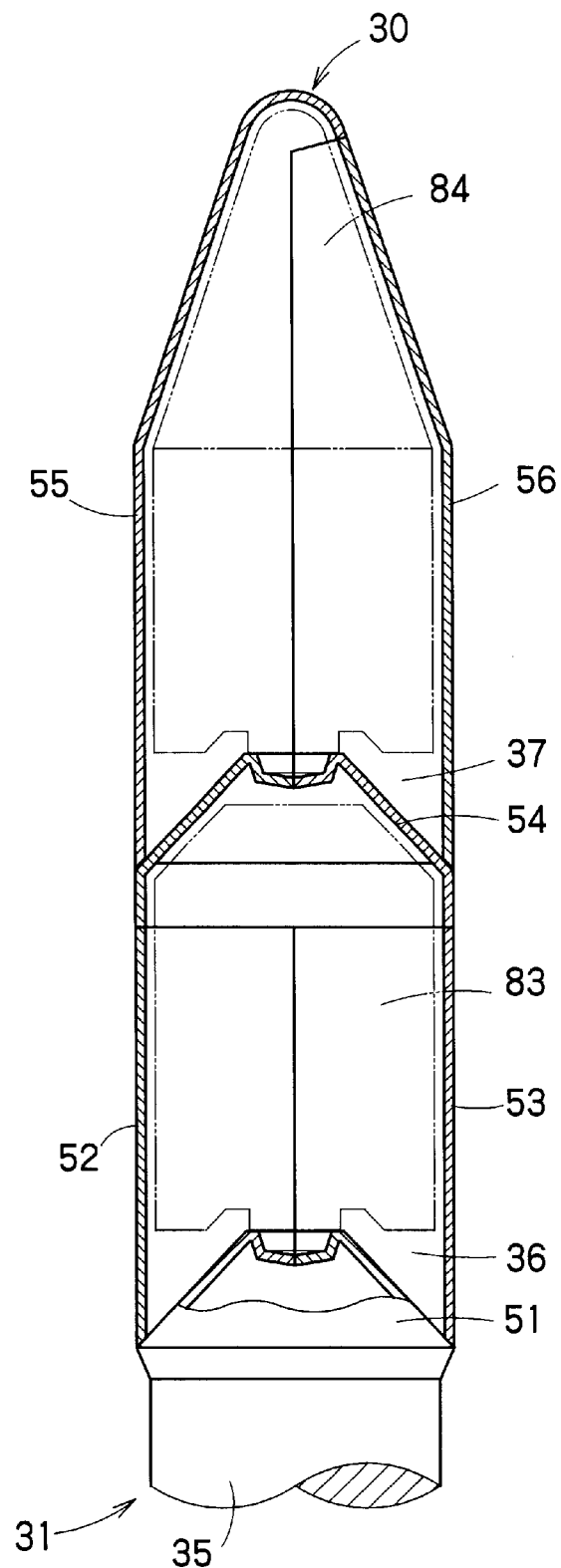
FIG. 3 is a longitudinal sectional view of the fairing shown in FIG. 1.

Accordingly, as shown in FIG. 3, an available storage region 83 slightly smaller than the first storage space 36 defined by the first side wall 43 can be secured. Even if the first satellite 32 takes the substantially entire first storage space 36 and the first satellite 32 is released in a direction deviating from the longitudinal axis of the fairing 30 and/or even if the first satellite 32 is made to make an angular motion when the same is released, the first satellite 32 will not collide with the first side wall 43.

Therefore, a base end portion of the first satellite 32 need not be tapered to avoid the interference between the base end portion of the first satellite 32 and the first side wall 43, and the first satellite 32 can entirely be formed in a cylindrical shape. The conventional techniques could not form the available storage region 83 for storing the first satellite 32 as large as an available storage region 84 for storing the second satellite 33. Since the first side wall 43 surrounding the first satellite 32 in this embodiment can be divided along a plane including the longitudinal axis of the fairing 30 into the first side wall segments 52 and 53, and the first side wall segments 52 and 53 are moved away from the first satellite 32, the available storage region 83 can be formed in a cylindrical shape of a diameter equal to that of the available storage region 84 for the second satellite 33. The diameter of the available storage region 83 is equal to that of an available storage region formed in a fairing for a rocket for launching a single satellite.

The first side wall segments 52 and 53 of the first side wall 43 surrounding the first satellite 32 disposed on the fairing-base side are supported pivotally by hinge mechanisms 75 and 76 on the first support structure 51.

As shown in FIG. 4, the opening mechanisms 87 and 88 apply forces to the first side wall segments 52 and 53 so as to move the first side wall segments 52 and 53 away from the first satellite 32. Each of the opening mechanisms 87 and 88 comprises a spring device including a compression coil spring having one end connected to the forward section 35 of the body 31.

Since the hinge mechanisms 75 and 76 hold the first side wall segments 52 and 53 for angular displacement by the portions thereof on the fairing-base side, respectively, a wide space can be secured around a path for the first satellite 32 disconnected and released from the first support structure 51.

Accordingly, the possibility of interference between the first side wall 43 and the first satellite 32 can be reduced and the first satellite 32 can have a great length along the longitudinal direction. The first side wall 43 can be opened with reliability by applying forces to the first side wall segments 52 and 53 in directions to move the first side wall segments 52 and 53 away from the first satellite 32 by the opening mechanisms 87 and 88.

The opening mechanisms 87 and 88 serve also as holding mechanisms for holding the first side wall segments 52 and 53 at predetermined angular positions, respectively. The opening mechanisms 87 and 88 serving as the holding mechanisms are able to hold the first side wall segments 52 and 53 in angular positions tilted to the axis of the first support structure 51 at the third predetermined angle, at which the joint members of the hinge mechanisms 75 and 76 are not disengaged. Thus, the first side wall segments 52 and 53, which are turned away from the first satellite 32 to their predetermined angular positions, can surely be restrained from turning toward the first satellite 32, whereby the interference between the first satellite 32 and the first side wall segments 52 and 53 when the first satellite 32 is released can be prevented with reliability.

Space contaminants thrown into and drifting in space will not be increased because the first side wall segments 52 and 53 of the first side wall 51 are kept connected to the first support structure 51 after the first side wall 43 has been opened.

Figure 5:
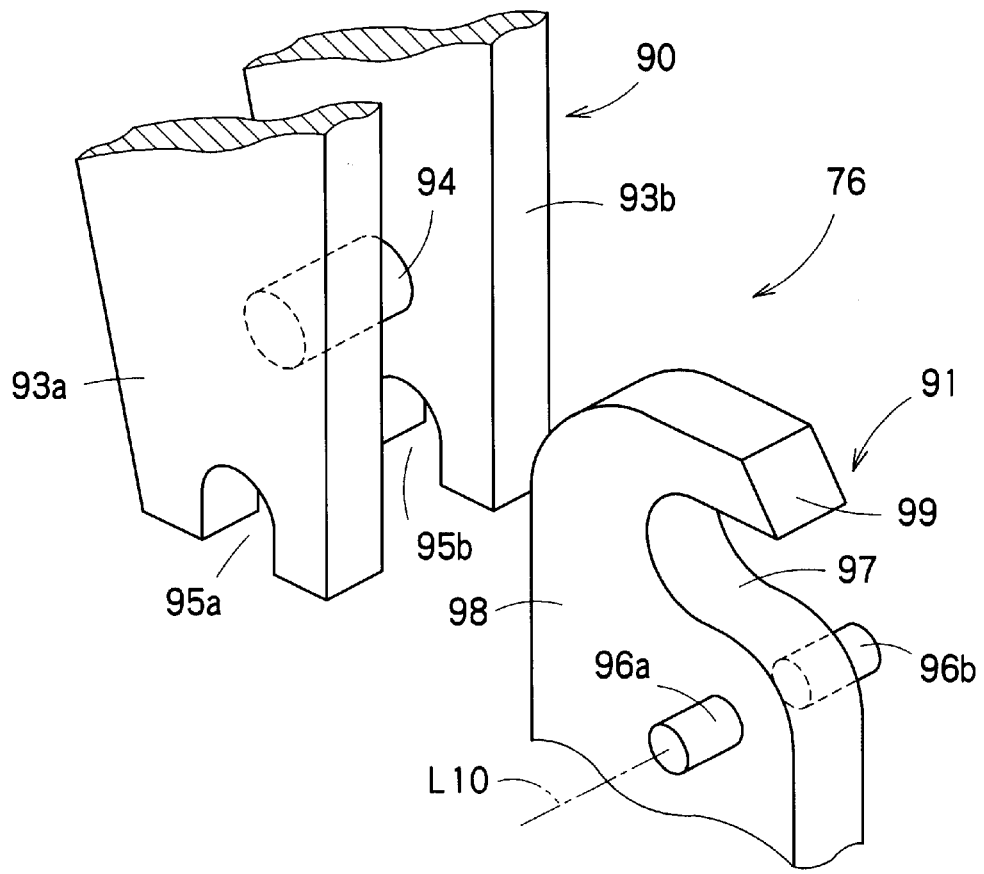
FIG. 5 is a perspective view of a hinge mechanism included in the fairing shown in FIG. 1.
Figure 6:
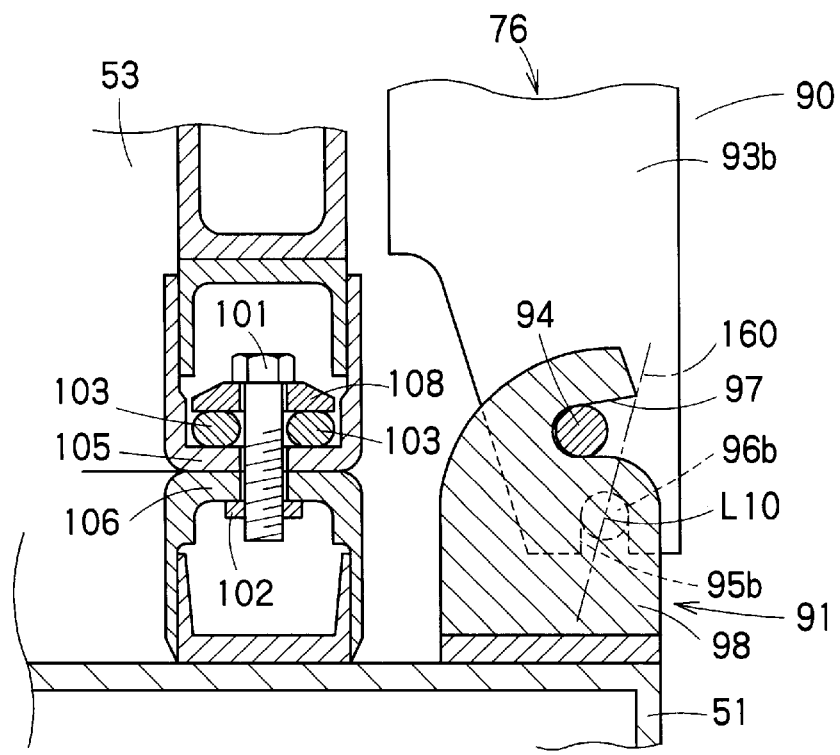
FIG. 6 is a sectional view of the hinge mechanism shown in FIG. 5 and members associated with the hinge mechanism.

FIG. 5 is a fragmentary perspective view of the hinge mechanism 76 and FIG. 6 is a sectional view of the hinge mechanism 76 and members associated with the hinge mechanism 76. The other hinge mechanisms 70, 71 and 75 are similar in construction as the hinge mechanism 76.

The hinge mechanism 76 has a movable joint member 90 attached to the first side wall segment 53, and a fixed joint member 91 attached to the first support structure 51. The movable joint member 90 has a pair plates 93a and 93b disposed in parallel to and spaced each other, and a retaining pin 94 extended between the pair of plates 93a and 93b. The plates 93a and 93b of the movable joint member 90 are provided in their base end portions on the fairing-base side with slots 95a and 95b extending away from the retaining pin 94 and opening in the base ends, respectively. The fixed joint member 91 has a plate 98 and a pair of hinge pins 96a and 96b attached to the opposite side surfaces of the plate 98 coaxially with each other. The fixed joint member 91 is provided with an open slot 97 for receiving the retaining pin 94 of the movable joint member 90, formed in its forward portion on the fairing-forward side so as to extend inwardly from its outer side along an arc of a circle having its center on the common axis L10 of the hinge pins 96a and 96b.

The plate 98 of the fixed joint member 91 is disposed between the plates 93a and 93b of the movable joint member 90 with the hinge pins 96a and 96b fitted in the slots 95a and 95b of the movable joint member 90, respectively. In a state where the retaining pin 94 and the hinge pins 96a and 96b are fitted in the slots 97, 95a and 95b, respectively, the movable joint ember 90 is only able to turn relative to the fixed joint member 91 about the common axis L10 of the hinge pins 96a and 96b. After the retaining pin 94 has moved out of the slot 97, the movable joint member 90 is able to move away from the fixed joint member 91.

Figure 7:
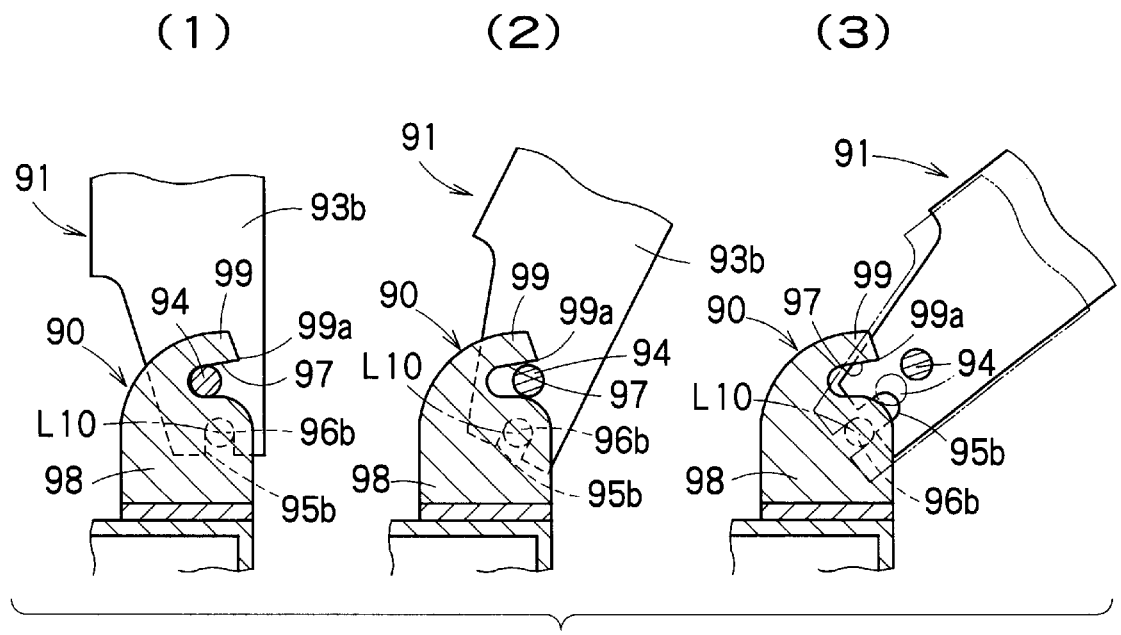
FIG. 7 is a schematic view of assistance in explaining the operation of the hinge mechanism shown in FIG. 5.

More specifically, the movable joint member 90 is able to turn relative to the fixed joint member 91 about the common axis L10 of the hinge pins 96a and 96b and is restrained from moving away from the fixed joint member 91 when the retaining pin 94 is at a position between the bottom of the slot 97 as shown in (1) of FIG. 7 and the open end of the slot 97 as shown in (2) of FIG. 7. That is, the movable joint member 90 and the fixed joint member 91 are kept connected so that the movable joint member 90 is able to turn about the common axis L10 of the hinge pins 96a and 96b relative to the fixed joint member 91 when at least a portion of the retaining pin 94 is in a range between the bottom of the slot 97 and a plane 160 (FIG. 6) including the free end 99a of a hook portion 99 defining forward boundary of the slot 97 on the fairing-forward side and the common axis L10 of the hinge pins 96a and 96b.

After the retaining pin 94 has completely moved out of the slot 97 as shown in (3) of FIG. 7, i.e., after the retaining pin 94 has moved away from the slot 97 beyond the plane 160, the hinge pins 96a and 96b are able to move out of the slots 95a and 95b, so that the movable joint member 90 is able to separate from the fixed joint member 91.

As mentioned above, when the first side wall 43 is opened and the first side wall segments 52 and 53 are turned away from each other, the opening mechanisms 87 and 88 capable of serving also as holding mechanisms stop the opening motions of the first side wall segments 52 and 53 before the hinge mechanisms 75 and 76 are turned to positions corresponding to that shown in (3) of FIG. 7 and hold the first side wall segments 52 and 53 at the predetermined angle (angular position). In this state, the movable joint member 90 and the fixed joint member 91 of each of the hinge mechanisms 75 and 76 are kept connected.

The opening motions of the second side wall segments 55 and 56 are not stopped, the hinge mechanisms 70 and 71 are turned to positions corresponding to that shown in (3) of FIG. 7 and the second side wall segments 55 and 56 are disconnected from the middle dividing structure 54.

As shown in FIG. 6, the fastening mechanism 153 shown in FIG. 1 has bolts 101 and nuts 102 for fastening together the first support structure 51 and the first side wall segment 53, and expandable shielded mild detonating cords (abbreviated to "ESMDCs") 103.

The first support structure 51 and the first side wall segment 53 have opposite walls 105 and 106, respectively. The bolts 101 are passed through holes formed in the opposite walls 105 and 106 at substantially equal angular intervals from the side of the first side wall segment 53, and the nuts 102 are screwed on the bolts 101 from the side of the first support structure 51. T-shaped holding members 108 are put on the bolts 101, respectively, on the side of the first side wall segment 53.

The ESMDC 103 is formed in a shape like a cord by sealing an explosive in a metal-coated tube. The ESMDCs 103 are extended in the entire region between the first support structure 51 and the first side wall segment 53, i.e., along the entire circular base end of the first side wall segment 53. The bolts 101 are arranged on the base end of the first side wall segment 53 at angular intervals, the ESMDCs 103 are held between the holding members 108 put on the bolts 101 and the wall 105, the nuts 102 are screwed on the bolts 101 to fasten together the first support structure 51 and the first side wall segment 53 with the ESMDCs 103 compressed between the holding members 108 and the wall 105, respectively. The two ESMDCs are extended on the opposite sides of each of the bolts 101, respectively.

The ESMDCs 103 are connected individually to detonating devices. Each of the bolts 101 is broken at a neck formed therein by detonating the ESMDC 103. Consequently, the first side wall segment 53 is unfastened from the first support structure 51. Even if one of the two ESMDCs 103 cannot be detonated due to the malfunction of the associated detonating device, the bolts 101 can be broken by detonating the other ESMDC 103 because the two ESMDCs 103 are detonated individually by the two detonating devices. Therefore, the first side wall segment 53 can be unfastened from the first support structure 51 with reliability.

The other fastening mechanisms 72 to 74 and 150 to 152 are the same in function, construction and effect as the fastening mechanism 153.

An explanation will be given of the necessary accuracy of the angle at which the first side wall segments 52 and 53 are to be held when releasing the first satellite 32 in anticipation of the deviation of the path of the released first satellite 32 from a correct direction. FIG. 8 is a top plan view of a portion of the fairing 30 shown in FIG. 4, and FIG. 9 is a sectional view taken on line IX—IX in FIG. 8.

In FIGS. 8 and 9, indicated at 110 is an imaginary circle representing the boundary of the base end of the first storage space 36 on the fairing-base side, at θ1 is the inclination of the first side wall segment 53 to the longitudinal axis of the fairing 30 and at 115 is an imaginary frustum representing the boundary of a region in which the first satellite 32 is able to move without colliding against the first side wall segments 52 and 53. The surface of the frustum including the line 115 expands toward the forward end of the fairing 30.

When the first side wall segment 53 is turned from an angular position outside the imaginary frustum 115, the corners 112 of the base end of the first side wall segment 53 are first portions of the first side wall segment 53 that cross the surface of the imaginary frustum 115. Therefore, the interference between the first satellite 32 and the first side wall segment 53 can be avoided when the first side wall segment 53 is held at an angular position where the corners 112 does not intersect the surface of the imaginary frustum 115, for example, at an angular position where the first side wall segment 53 is tilted at θ1=6.4° to the longitudinal axis of the fairing 30. An angular position at which the first side wall segment 52 be held is determined similarly.

Figure 10:
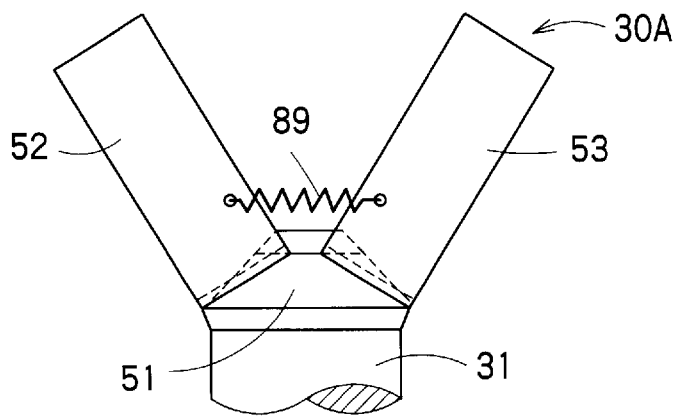
FIG. 10 is a schematic front elevation of a portion of a fairing in a first modification of the fairing shown in FIG. 1.

FIG. 10 shows a fairing 30A in a first modification of the fairing 30 shown in FIG. 1 in a front elevation. The fairing 30 shown in FIG. 1 employs the opening mechanisms 87 and 88 comprising springs for turning the first side wall segments 52 and 53. The fairing 30A employs an opening mechanism 89 comprising a compression coil spring and connected to first side wall segments 52 and 53 instead of the opening mechanisms 87 and 88.

The opening mechanism 89 is capable of turning the first side wall segments 52 and 53 in opening directions and of holding the first side wall segments 52 and 53 at a predetermined angular position. The fairing 30A employing the opening mechanism 89 is the same in effect as the fairing 30.

Figure 11:
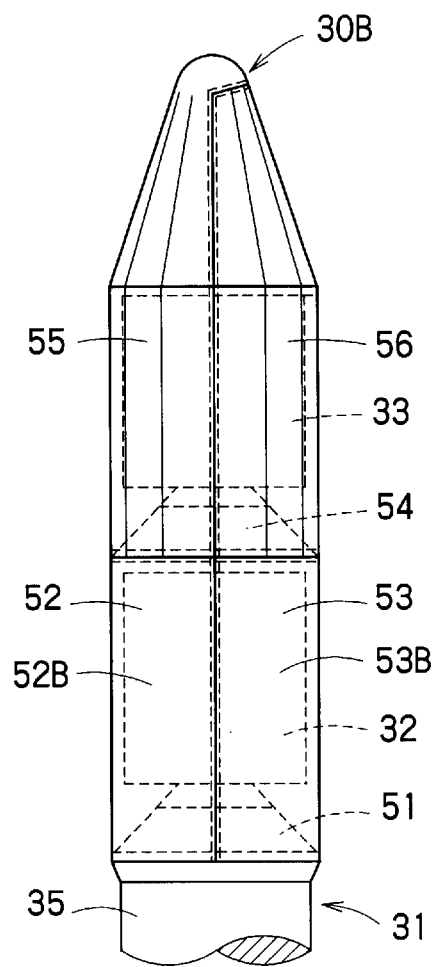
FIG. 11 is a schematic front elevation of a fairing in a second modification of the fairing shown in FIG. 1.

FIG. 11 shows a fairing 30B in a second modification of the fairing 30 shown in FIG. 1 in a schematic front elevation and FIG. 12 shows the fairing 30B in an exploded front elevation.

In the fairing 30 shown in FIG. 1, the middle dividing structure 54 and the first side wall segments 52 and 53 are separate components and are parted from each other. In the fairing 30B, a middle dividing structure 54 is divided into two parts 170 and 171 each having a shape formed by dividing a frustum along a plane including its longitudinal axis, and the parts 170 and 171 are formed integrally with the first side wall segments 52 and 53 to form two covering shells 52B and 53B, respectively.

In the fairing 30 shown in FIG. 1, the middle dividing structure 54 and the first side wall segments 52 and 53 are separated from each other to open the first storage space 36. In the fairing 30B, the middle dividing structure 54 and the first side wall segments 52 and 53 are divided into the covering shells 52B and 53B.

The fairing 30B reduces the number of components and the number of individual components scattered in space, and prevents the increase of space contaminants thrown into and drifting in space.

Figure 13:
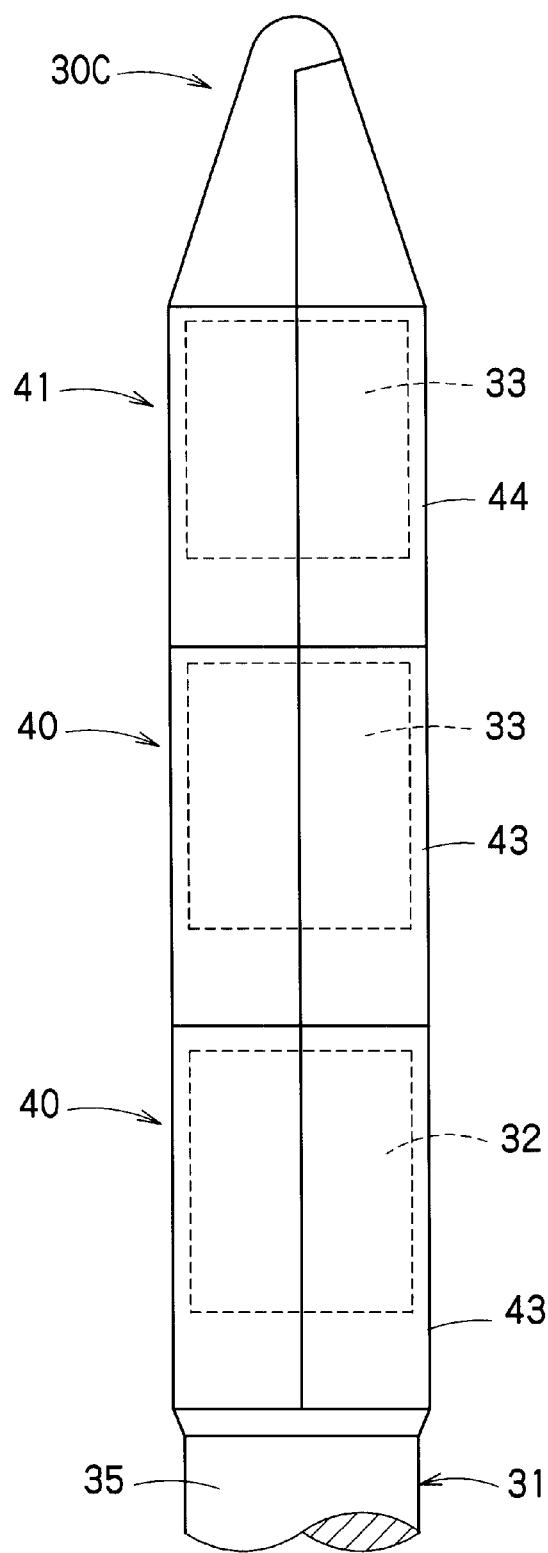
FIG. 13 is a schematic front elevation of a fairing in a third modification of the fairing shown in FIG. 1.
Figure 14:
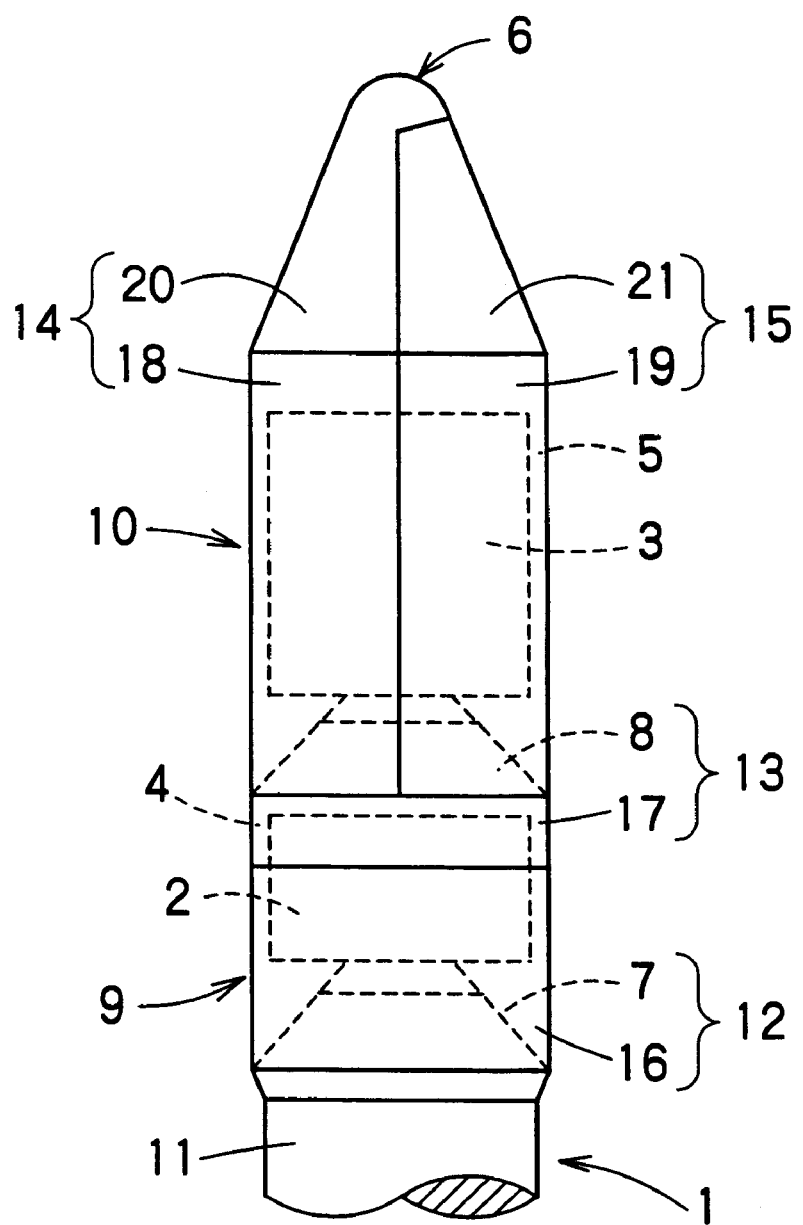
FIG. 14 is a front elevation of a conventional fairing.
Figure 15:
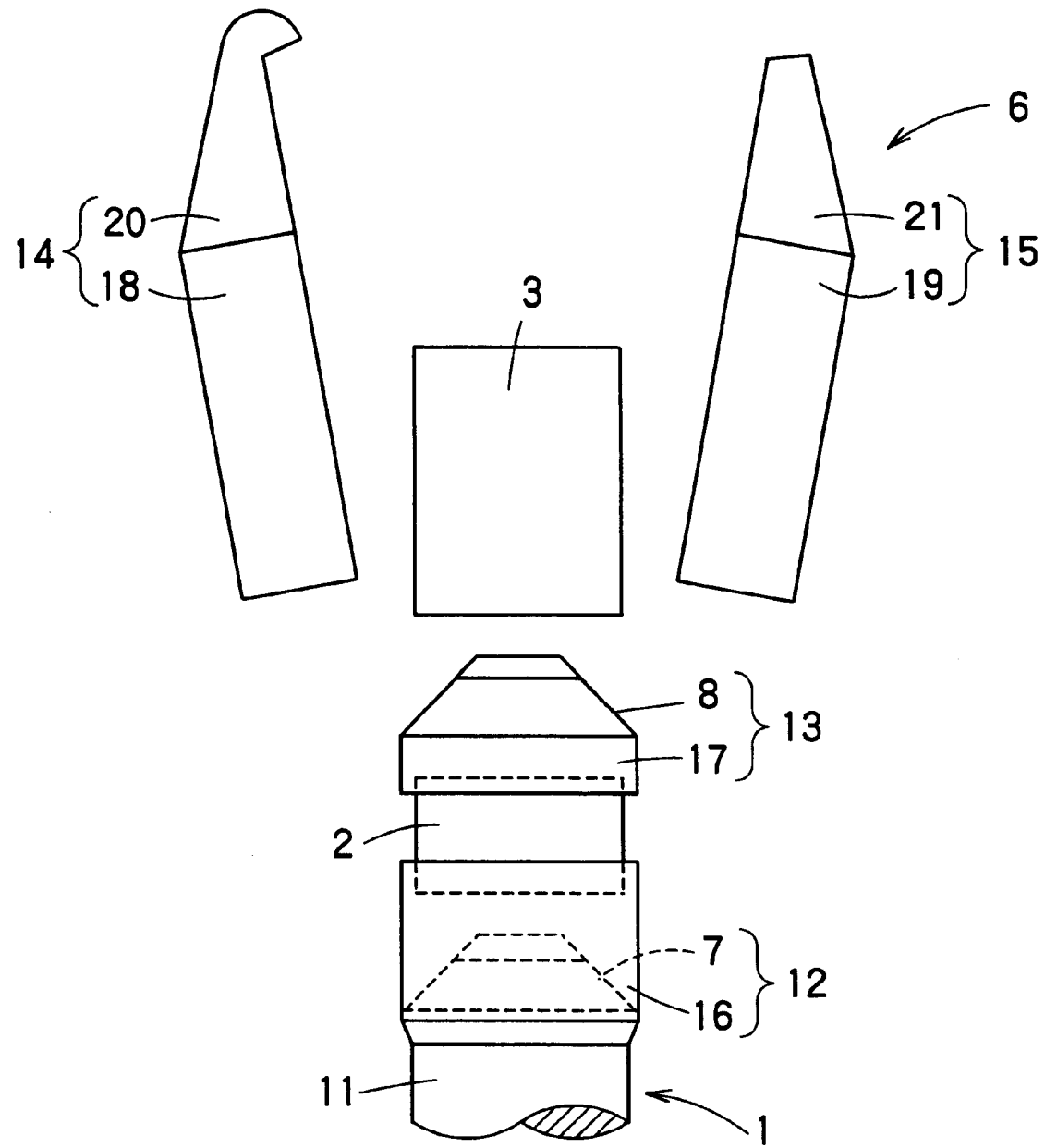
FIG. 15 is an exploded front elevation of the fairing shown in FIG. 14.
Figure 16:
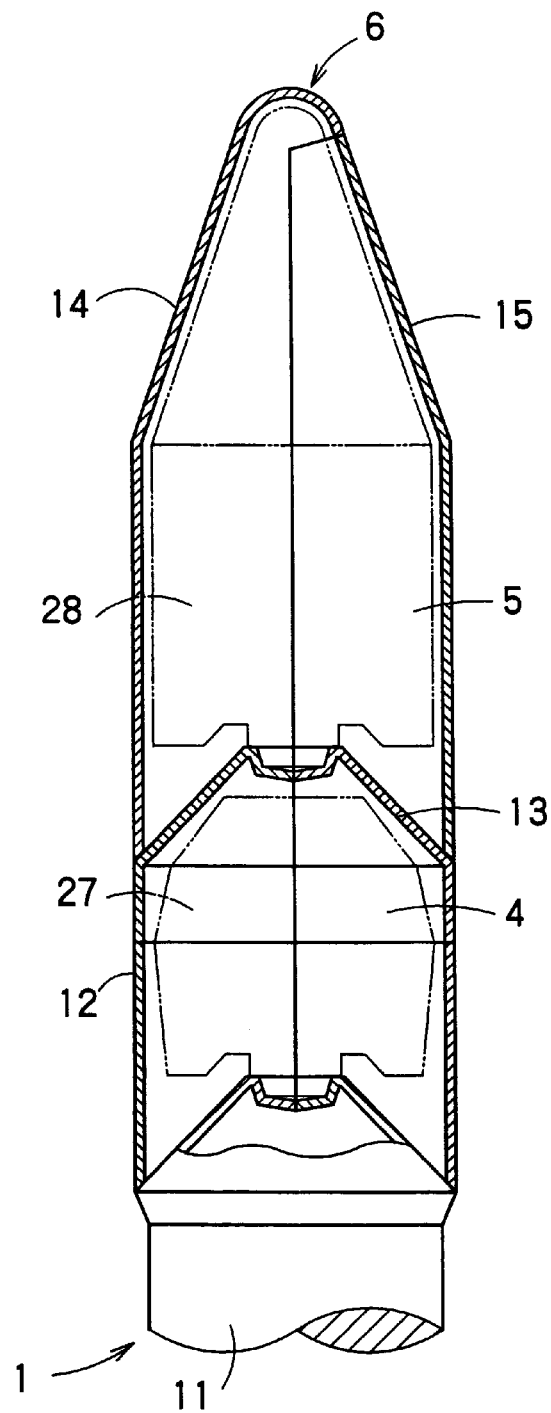
FIG. 16 is a longitudinal sectional view of the fairing shown in FIG. 14.

FIG. 13 shows a fairing 30C in a third modification of the fairing 30 shown in FIG. 1 in a front elevation. As shown in FIG. 13, the fairing 30C has a plurality of first structures 40 successively arranged along the longitudinal axis of the fairing 30B and connected together, and a second structure 41 connected to the first structure 40 on the fairing-forward side. First, the second structure 41 is opened and a third satellite 33 is released into space, and then the plurality of first structures 40 are opened sequentially from the first structure 40 nearest to the forward end of the fairing 30C toward the first structure 40 nearest to the base end of the fairing 30C to release first satellites 32 contained therein sequentially into space. The side walls 43 of the first structures 40 other than the side wall 43 of the first structure 40 nearest to the base end of the fairing 40C are thrown into space after opening the first structures 40. The side wall 43 of the first structure 40 nearest to the base end of the fairing 30C may be thrown into space or may be kept, connected to the forward section 35 of the body 31 after opening the same first structure 40.

The present invention is not limited in its practical application to the embodiment and the modifications of the same specifically described herein and changes in shape and the like are possible therein. For example, the middle dividing structure 54 may be formed integrally with one of the first side wall segments 52 and 53 without dividing the same into two parts. The payloads need not be limited to satellites but may be space probes, space crafts and the like.

The first side wall segments 52 and 53 forming the first side wall 43 surrounding the first satellite 32 disposed on the fairing-base side may be disconnected from the body 31 and thrown into space when releasing the first satellite 32 into space. When releasing the first satellite 32 onto an orbit at an altitude higher than that of an orbit onto which the second satellite 33 is released, the first side wall segments 52 and 53 of the first side wall 43 surrounding the first satellite 32 are disconnected from the body 31 after the second satellite 33 has been released into space, and then the first satellite 32 is moved to the higher orbit. When the first side wall 43 is thrown into space before moving the first satellite 32 to its orbit, the first side wall 43 need not be carried to the orbit of the first satellite 32 and hence power can be saved. Therefore, the first satellite 32 can be launched onto a higher orbit by using the same power.

The first side wall 43 and the second side wall 44 can be divided into more than two pieces, respectively, along several planes including the longitudinal axis of the fairing.

As is apparent from the foregoing description, the first side wall surrounding the first payload is opened along a plane or planes including the longitudinal axis of the fairing into the plurality of first side wall segments, and the plurality of first side wall segments can be turned away from the first payload to secure a wide space around a path along which the first satellite is released. Therefore, a large available storage region can be secured in the first storage space surrounded by the first side wall, and allowable dimensions of the first payload can be increased.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A rocket fairing mounted on a forward section of a rocket body included in a rocket said rocket fairing comprising:

a first structure for storing a first payload disposed on a fairing-base side, the first structure comprising a first side wall defining a first storage space for storing the first payload therein, and a first support structure disposed in the first storage space to support the first payload by its base part, the first side wall comprising a plurality of first side wall segments capable of being separated from each other along a plane including a longitudinal axis of the fairing and of being turned away from the first payload when releasing the first payload from the first storage space, a base end of each of the first side wall segments being pivotally connected to the forward section of the rocket body by a hinge mechanism having first and second joint members capable of separating from each other when the first side wall segment is turned through an angle exceeding a predetermined angle;

a holding means for holding an opening angle of the first side wall segments at an angle smaller than the predetermined angle in order that the first side wall segments remain on the forward section of the rocket body after the first side wall is opened;

a second structure for storing a second payload disposed on a fairing-forward side, separably connected to a forward end of the first structure and forming a forward section of the fairing; and a second support structure adapted to support the second payload, the second support structure comprising a plurality of second support segments formed integrally with the first side wall segments, respectively, wherein the second support segments are opened together with the first side wall segments when the first side wall is opened.

2. The rocket fairing according to claim 1, wherein the first joint member of the hinge mechanism is a movable joint member attached to the base end of the first side wall segment and provided with a retaining pin, and the second joint member is a fixed joint member attached to the rocket body and provided with a hinge pin, wherein the movable joint member is provided with a slot for receiving the hinge pin of the fixed joint member, the slot being formed in a base end of the movable joint member so as to extend toward the fairing-forward side, and the fixed joint member is provided with a slot for receiving the retaining pin of the movable joint member, the slot being formed in a forward portion of the fixed joint member so as to extend inwardly from an outer side of the fixed joint member.

3. The rocket fairing according to claim 2, wherein the movable joint member turns together with the first side wall segment on the hinge pin of the fixed joint member, the retaining pin of the movable joint member moves out of the slot of the fixed joint member and the movable joint member separates from the hinge pin of the fixed joint member when the first side wall segment is turned through an angle exceeding the predetermined angle, and each of the first side wall segments separates from the forward section of the rocket body of the rocket.

4. The rocket fairing according to claim 2, wherein the movable joint member turns on the hinge pin of the fixed joint member together with the first side wall segment when the first side wall is opened, the first side wall segment is restrained from turning by the holding means before the first side wall segment is turned through an angle exceeding the predetermined angle, and the first side wall segments are held in an opened position at an angle smaller than the predetermined angle.

5. The rocket fairing according to claim 1, wherein a plurality of the first structures are connected end to end, and the second structure is connected to the first structure nearest to a forward end of the fairing.

6. The rocket fairing according to claim 5, wherein the structures open successively starting from the first structure nearest to the forward end of the fairing toward the first structure nearest to a base end of the fairing to release a plurality of the first payloads successively, after opening the second structure and releasing the second payload.

7. The rocket fairing according to claim 1 further comprises an opening means for applying forces to the first side wall segments to move the first side wall segments away from the first payload when the first side wall is opened.

8. The rocket fairing according to claim 1, wherein the first side wall segments are separated from the forward section of the rocket body of the rocket when the first side wall is opened.

9. The rocket fairing according to claim 1, wherein the first side wall segments of the first side wall remain on the forward section of the rocket body of the rocket after opening the first side wall.

\* \* \* \* \*